United States Patent
Lambert

(10) Patent No.: US 8,000,719 B1
(45) Date of Patent: Aug. 16, 2011

(54) MULTI-MODE LOCATION SERVICES

(75) Inventor: Paul Aerick Lambert, Mountain View, CA (US)

(73) Assignee: Pico Mobile Networks, Inc., Sunnyvale, CA (US)

( * ) Notice: Subject to any disclaimer, the term of this patent is extended or adjusted under 35 U.S.C. 154(b) by 924 days.

(21) Appl. No.: 11/782,401

(22) Filed: Jul. 24, 2007

Related U.S. Application Data

(60) Provisional application No. 60/860,565, filed on Nov. 21, 2006.

(51) Int. Cl.
*H04W 24/00* (2009.01)
*H04W 4/00* (2009.01)

(52) U.S. Cl. .................... 455/456.1; 455/456.2; 455/466

(58) Field of Classification Search ............... 455/456.1, 455/456.2, 466
See application file for complete search history.

(56) References Cited

U.S. PATENT DOCUMENTS

| | | | |
|---|---|---|---|
| 6,272,120 B1 | 8/2001 | Alexander | |
| 6,600,726 B1 | 7/2003 | Nevo et al. | |
| 6,795,701 B1 | 9/2004 | Baker et al. | |
| 6,932,698 B2 | 8/2005 | Sprogis | |
| 7,072,323 B2 | 7/2006 | Roberts et al. | |
| 7,097,562 B2 | 8/2006 | Gagner | |
| 7,143,171 B2 * | 11/2006 | Eriksson et al. ............... 709/227 |
| 7,181,544 B2 | 2/2007 | Vangal et al. | |
| 7,224,964 B2 | 5/2007 | Souissi et al. | |
| 7,236,772 B1 | 6/2007 | Botzas | |
| 7,251,235 B2 | 7/2007 | Wentink | |
| 7,308,263 B2 | 12/2007 | Gallagher et al. | |
| 2005/0079873 A1 * | 4/2005 | Caspi et al. ................. 455/456.1 |
| 2006/0063539 A1 * | 3/2006 | Beyer, Jr. .................. 455/456.3 |
| 2006/0172736 A1 * | 8/2006 | Nevo ........................... 455/435.1 |
| 2007/0026866 A1 * | 2/2007 | Krishnamurthi et al. ...... 455/440 |
| 2007/0082671 A1 * | 4/2007 | Feng et al. ..................... 455/436 |
| 2007/0197237 A1 * | 8/2007 | Powell et al. ................. 455/466 |
| 2008/0123608 A1 * | 5/2008 | Edge et al. .................... 370/338 |
| 2010/0093374 A1 * | 4/2010 | Dacosta ....................... 455/456.3 |

OTHER PUBLICATIONS

Meredith, John; "Voice Call Continuity in 3GPP"; CompactPCI and AdvancedTCA systems; Apr. 2006; 2 pages.
"Universal Mobile Access: UMA Expands Beyond Dual-Mode Handsets"; The UMA Company; Jan. 2007; 8 pages.

* cited by examiner

*Primary Examiner* — Barry W Taylor

(57) ABSTRACT

A wireless device including a first communication module, a second communication module, and a processor. The first communication module is configured to communicate with a cellular antenna tower of a cellular network. The second communication module is configured to communicate with a device associated with a Wi-Fi network. The processor is configured to determine a first territorial range in which the wireless device is located based on a location of the cellular antenna tower of the cellular network, determine a second territorial range in which the wireless device is located based on a location of the device associated with the Wi-Fi network, and in response to the second territorial range being within the first territorial range, establish a location of the wireless device as being within the second territorial range.

16 Claims, 5 Drawing Sheets

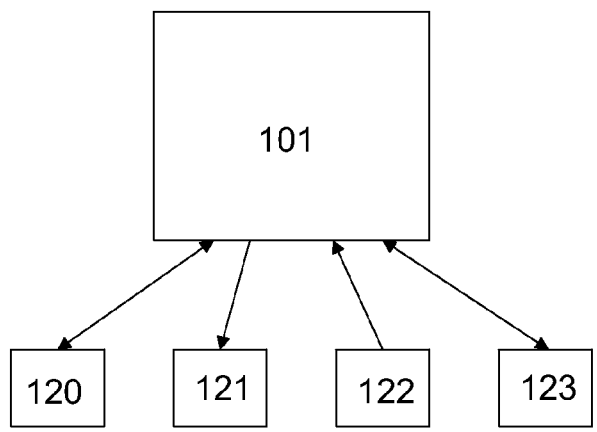
FIG. 4
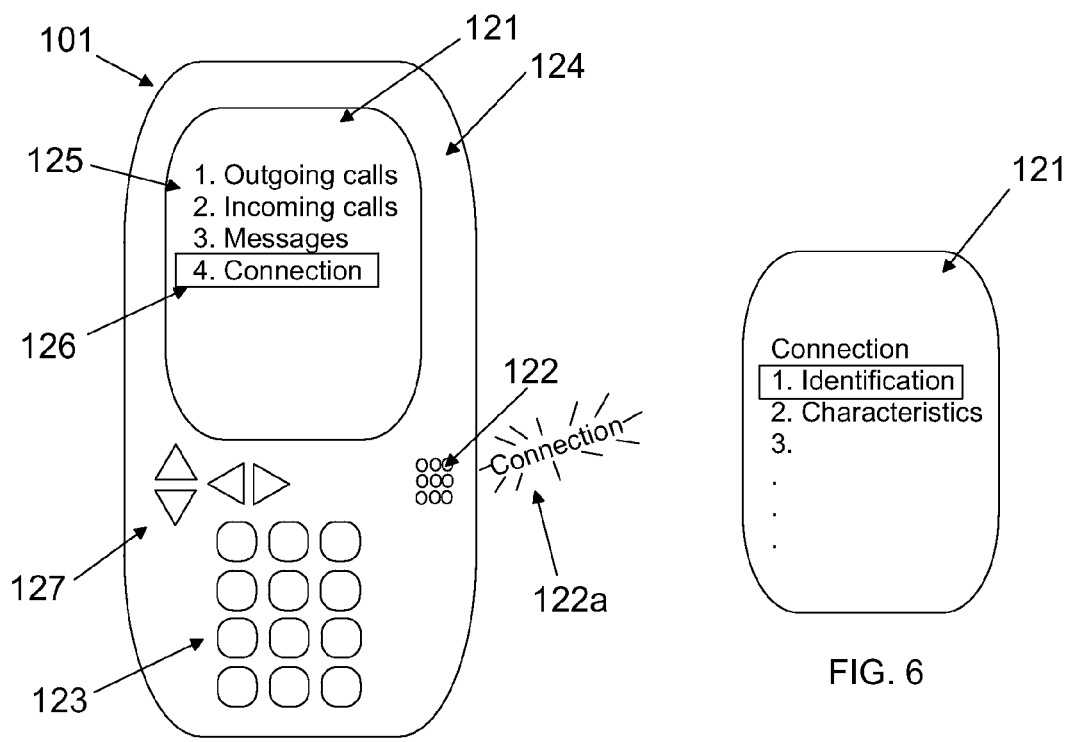
FIG. 5
FIG. 6

MULTI-MODE LOCATION SERVICES

This application claims benefit and priority of Provisional Application Ser. No. 60/860,565 filed Nov. 21, 2006.

FIELD OF THE INVENTION

The present invention relates to wireless devices capable of communicating via local wireless networks having a base station with a relatively limited wireless communication reach and simultaneously with a relatively wide range cellular network.

BACKGROUND OF THE INVENTION

Cellular communication networks comprise relatively widely spaced apart cellular antenna towers in order to reduce the number of such antenna towers required to provided continuous coverage, via hand-offs between antenna towers, for mobile cellular communications devices. The cellular networks were designed originally for minimizing the cost of mobile roaming of a cellular phone user by arriving a balance of customer-acceptable reception for the customer's roaming area versus the installation, antenna towers in order to reduce the number of such antenna towers required to provide continuous coverage, via hand-offs between antenna towers, for mobile cellular communications devices. The cellular networks were designed originally for minimizing the cost of mobile roaming of a cellular phone user by arriving a balance of customer-acceptable reception for the customer's roaming area versus the installation, resulted in installation of more powerful and numerically more antenna towers, their geographical density is limited by practical economics of customer acceptance of services provided.

Thus, cellular network antenna towers will always remain relatively widely spaced apart due to economic considerations. It is well known that communication of a specific cellular communication device, such as a telephone, with the cellular network is such that the antenna tower through which the device is communicating at any time, including when no phone connection has been made but the device is turned on, can be determined and is recorded in the records of the cellular service provider. Such information has been critical to identifying the general location of a user of the specific communication device. However, the location of a transmitting or receiving communication device can be determined only to within a relatively wide area, i.e., within several hundred feet. While some cellular communications devices are being equipped with global positioning systems that allow the location of the communication device to be determined much more accurately, the addition of such a GPS capability to a cellular communication device adds weight, cost and design complexity to such a device. Improving the ability of a cellular communication device to be accurately located by its communication with cellular antenna towers is technologically possible but not economically viable.

However, many cellular communication devices have been equipped with what is referred to as Wi-Fi capability without adding unacceptably to the weight, price or operational complexity of such a device. In contrast to the original design of the cellular communications networks to accommodate wide geographic coverage, Wi-Fi networks were originally designed to have very limited physical transmission range, having been assigned to work within the 2.4 GHz frequency that is also used by cordless phones and microwave ovens. Limiting the range was a practical way to assure that local communications would not be interrupted by noise or competing transmissions. Prior to installing a local Wi-Fi "hotspot" network, the installer could evaluate the operational range of the hotspot for likely sources of interference and anticipate the potential for users of the hotspot network to experience unacceptable levels of interference.

Indoor range of Wi-Fi hotspots is typically limited to about 100 to 150 feet. Outdoor range is about 300 feet. It is well known that, even as cellular antenna density increases with improved location capability, that the effective range of operation of Wi-Fi networks is increasing by way of the use of multiple wireless access points operating for the same network, range extenders or wireless repeaters, and improved antennas with greater power and elevation so that, in some cases, extends the range of communication of a Wi-Fi network up to several kilometers from such an antenna. Community-wide Wi-Fi networks are now common across the United States.

In a Wi-Fi network, each separate piece of hardware comprises a unique identifier. At a top level, the Wi-Fi network itself transmits with every packet a session set identifier (SSID) which is generally comprised of a 32 element alphanumeric identity and uniquely identifies the network. Some Wi-Fi networks are intentionally designed so that the SSID is not transmitted in outgoing packets in an ineffective attempt to keep the network from being used by unauthorized users. Regardless of the transmission of an SSID, a basic operational unit of the Wi-Fi network is the access point, a device which wirelessly communicates with multiple wireless Wi-Fi enabled devices. The Wi-Fi network is provided with at least one and, many times, multiple access points, each having a specific identifier and potential and actual broadcast range in its physical location. The Wi-Fi network may also comprises other devices which extend the range of an access point, where each of these range extenders also comprise, in operation, a specific identifier and potential and actual broadcast range in its physical location.

Wi-Fi networks can connect via a broadband Internet connection into a single router which can serve both wired and wireless clients, can connect in an ad-hoc mode for client to client wireless connections, and can connect non-computer devices to enable wireless connectivity to other devices or the Internet. Increasing the number of Wi-Fi access points in an environment provides redundancy and local roaming, thereby increasing overall network capacity by using more channels and/or creating smaller operational cells per access point. In addition, metropolitan-wide WiFi (Mu-Fi) has become a reality as a result of the use of multiple access points and range extenders. It is well known that the Wi-Fi protocol 802.11a, b, g and n are the agreed upon international standard for creating and operating Wi-Fi networks.

Turning again to communication via cellular networks, a text message capability has long been in operation in such networks. The Short Message Service (SMS) comprises a very short text message (a typical limitation is 160 characters) composed at a sender client and transmitted via wireless cellular communication to a Short Message Service Centre (SMSC) which operates upon received short messages to first store the short message, determine a recipient client, and forward the stored message. The operation of a message center relieves the wireless device of the sender client from the task of assuring the transmission operation to a recipient client is completed as required. The SMSC attempts to send messages to a recipient client. If a recipient client is not reachable, the SMSC queues the message for later retry. Some SMSC's also provide a "forward and forget" option where transmission is tried only once. Both Mobile Terminated (MT), for messages sent to a mobile handset, and Mobile Originating (MO), for those that are sent from the mobile handset, operations are supported. Message delivery is best effort, so there are no guarantees that a message will actually be delivered to its recipient and delay or complete loss of a message is not uncommon, particularly when sending a message between networks. Sender clients may obtain delivery reports for transmitted short messages. These reports provide positive confirmation that the short message reached the recipient client. SMS is a very effective form of communication for short messages where the recipient client cannot presently receive a wireless communication (out of radio range), is not able to take a call, etc. SMS does not use Internet connection for delivery of the text message, thereby eliminating a requirement for Internet connection by the sender client. SMS guarantees relative privacy as opposed to transmission of an identical email transmission via Internet communication. SMS is a very secure and private person-to-person communication in the realm of wireless communications.

There is a need for integration of the short message capabilities of a sender client of a cellular network device with the physical location capabilities of that device when it is Wi-Fi enabled and can obtain specific physical location information either directly from a memory of a specific Wi-Fi network or which can be obtained otherwise.

SUMMARY OF THE INVENTION

The present invention is a system integrating information sending or short messaging capabilities of a sender client of an invention cellular network device with the physical location capabilities of that device when it is Wi-Fi enabled and can obtain specific physical location information either directly from a memory of a specific Wi-Fi network or which can be obtained otherwise. An example is a cellular phone having means for and subscribing to a cellular service with SMS and that is Wi-Fi enabled according to the invention.

In the invention system, the cellular device obtains or determines a first geographic location (i.e., latitude and longitude or by street map or other coordinates usable by a user to determine their location) as that topographic territory where the cellular device is within according to the locations of cellular antenna towers which are in direct communication with the cellular device. A second geographic location is determined via wireless determination communication between the cellular device and a Wi-Fi network, and, optionally, the cellular network. The second geographic location is that territory within which the cellular device must be located in order to have wireless communication with the Wi-Fi network.

In one embodiment of the invention, the cellular device or other devices communicating with the cellular device can use the information of the first and second geographic locations to arrive at a most accurate actual location of the cellular device. For instance, a comparison is made to determine that the second geographic location is within the territory of the first geographical location, which is typically a larger territory than the range of the Wi-Fi network. Alternately, the determination of the second geographical location can be used, if found to be more reliable than the determination of the first geographical location, to confirm the first geographical location.

According to the invention system, a determination of that a cellular device is within a small topographic range is information that is used in many ways. The information may be, automatically or by user-actuation, transmitted via the cellular network or to other networks via the Wi-Fi network to a recipient device. The recipient device can cause the cellular device location information to be displayed so a recipient knows the location of a user of the cellular device. User input into the cellular device can limit the details of the user's actual location, i.e., the user can limit transmission of his location information to the recipient to include only a city and state. In an unlimited transmission of location information, a recipient may receive location details such as the location of the cellular device at a specific street location, business or residence name, a latitude and longitude, proximity to location determining landmarks, proximity to specific services, businesses, risks, or residences, and other such location defining data. In addition, the user may cause the cellular device to transmit to the recipient user status messages, such emergency or help-needed for the user. A cellular device may, periodically or upon a user input request, determine and store the close coupled location determination of the cellular device using information from both the cellular and Wi-Fi networks.

A determination communication by the cellular device or at a remote correspondent is intended to obtain therefrom a most accurate determination of actual geographic location (i.e., latitude and longitude or by street map or other coordinates usable by a user to determine their location) as that topographic territory where the cellular device is at according to the location data of the Wi-Fi network. Many Wi-Fi networks (or a specific access point of the network or range extender of an access point) have such limited range that the second geographic location of the cellular device can be determined within a radius of about 100 feet.

A first form of the determination communication includes the cellular device receiving in a wireless signal an SSID (or its equivalent) from a broadcasting Wi-Fi network. Establishing a duplex connection with the network is not necessary if a satisfactory determination of the second geographic location can be made using only the SSID. The cellular device may, by previous contact with the same Wi-Fi network or by previous input to memory, have in a look-up table a territory associated with that specific Wi-Fi network. If the physical territory of that specific Wi-Fi network is not accessible in the memory of the cellular device, the cellular device may query, by SMS, email, or otherwise in a data communication, a remote source which stores physical broadcast territories of specific Wi-Fi networks, including the likely territories of multiple access points and range extenders to reduce the size of such territories. The remote source can provide directly to the cellular device or to other recipients the second geographic location.

Where a communication session with the Wi-Fi network has been established, a determination of the second geographic location can be made by way of requesting location data from the Wi-Fi network itself. Alternately, a remote source can be accessed by the cellular device via connection of the Wi-Fi network with the Internet or other computer network. The remote source can respond to such access directly to the cellular device or to other recipients the second geographic location. It is intended that wireless communications between the Wi-Fi network and the cellular device be made via an appropriate 802.11 protocol.

The first geographic location can be obtained by way of an authorized request made to the cellular network providing cellular service to the cellular device. The cellular network transmits coordinates or general street/landmark information indicating a first geographic location. This transmission can be made to the cellular device or to another recipient previously authorized for such reception by the user.

BRIEF DESCRIPTION OF THE DRAWINGS

FIG. 4 is a block diagram of a first wireless mobile communication device.

FIG. 5 is a front view of a housing of the device of FIG. 4.

FIG. 6 is a further display screen of the device of FIG. 5.

DETAILED DESCRIPTION OF THE INVENTION

The invention is now discussed with reference to the figures.

Figure 1:
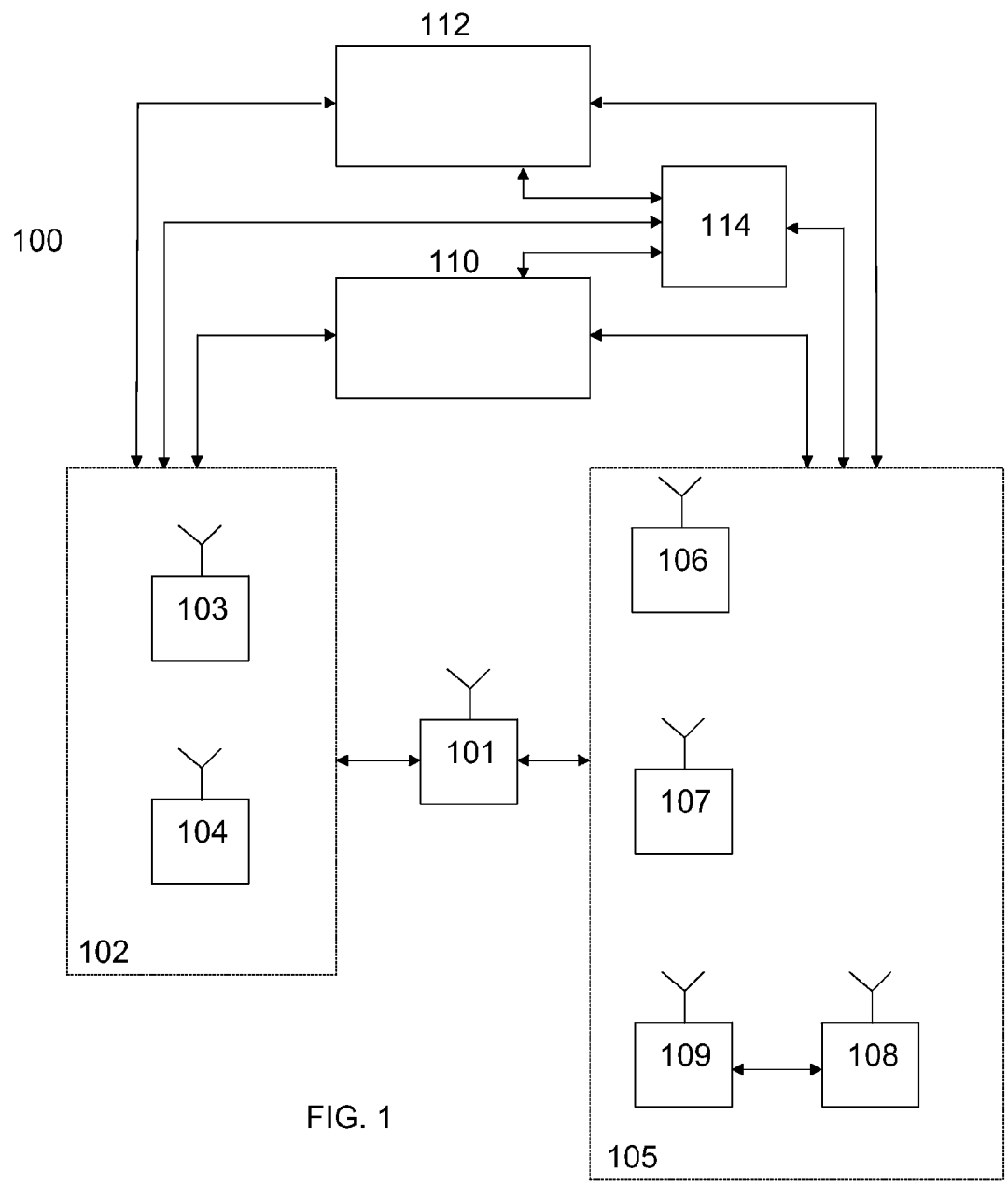
FIG. 1 is a block diagram of the invention system.

FIG. 1 shows an integrated location determination system 100 comprising a cellular network device 101. Cellular device 101 comprises a communications means capable of establishing and maintaining wireless communications with cellular network 102. Cellular device 101 comprises wireless communications modules for communication with cellular network 102 as well as Wi-Fi network 105, with said communications modules effectively connected with a communications microprocessor and memory within cellular device 101. A control program resident in the memory of the cellular device 101 operates said microprocessor and causes the establishment of communications sessions by cellular device 101 for transmission or reception of audio and/or visual image communications. Cellular device 101 is uniquely identified by identification numbers or addresses with the cellular network 102 and the Wi-Fi network 105. It is preferred that communications sessions between the cellular device 101 and the Wi-Fi network 105 be established under one or more of the available protocols under IEEE 802.11.

Cellular network 102 comprises multiple antenna towers connected by wire or wireless connection with a computer network for providing cellular telephone communications through cellular or PSTN telephone systems 114 (or through cellular network 102 directly) with recipient 114, where such communications may include direct transmission of text and/or graphic images or video (referred to herein as "cellular communications"). Cellular communications may include SMS, which may transmit from cellular device 101 short text messages automatically or upon input from a user. Cellular network comprises a computer network connected with towers 103 and 104 that are within communications range of cellular device 101. Cellular communications also include requests from cellular device 101 to the cellular network for a determination of a first geographical location of cellular device 101 based upon communication of device 101 with towers 103 and 104. Cellular network 102 responds to that request by transmitting to cellular device 101 and/or to recipient 114 the first geographical location of the cellular device 101.

Wi-Fi network 105 comprises multiple wireless access points 106, 107 and 108 that are connected with Wi-Fi computer means for establishing Wi-Fi sessions with appropriately enabled devices such as the cellular device 101. A range extender 109 is connected with access point 108 to extend the range of access point 108. Each of the access points 106, 107 and 108 and extender 109 comprise a separate communications range for communications with the cellular device 101. A second geographic location of the cellular device 101 is the territory of (1) the communications range of one the access points 106-108 or repeater 109 if device 101 communicates only with one of them or (2) the overlap of the communications ranges of two or more of the access points 106-108 or repeater 109 if device 101 communicates only with two or more of them. Each of the wireless access points 106-108 and repeater 109 are uniquely identified by network 105 so that network 105 operates to determine which of these wireless communications portals is in wireless communication with cellular device 101.

Optionally, cellular network 101 and Wi-Fi network 105 are in connection with Internet 110 for communication with recipient 114 by way of VoIP, email, web browsing, and/or automated connection, i.e., such as under direction of a captive portal directing first or subsequent communications through network 105 to a specific website whose requirements must be met prior to further Internet access by cellular device 101.

Figure 2:
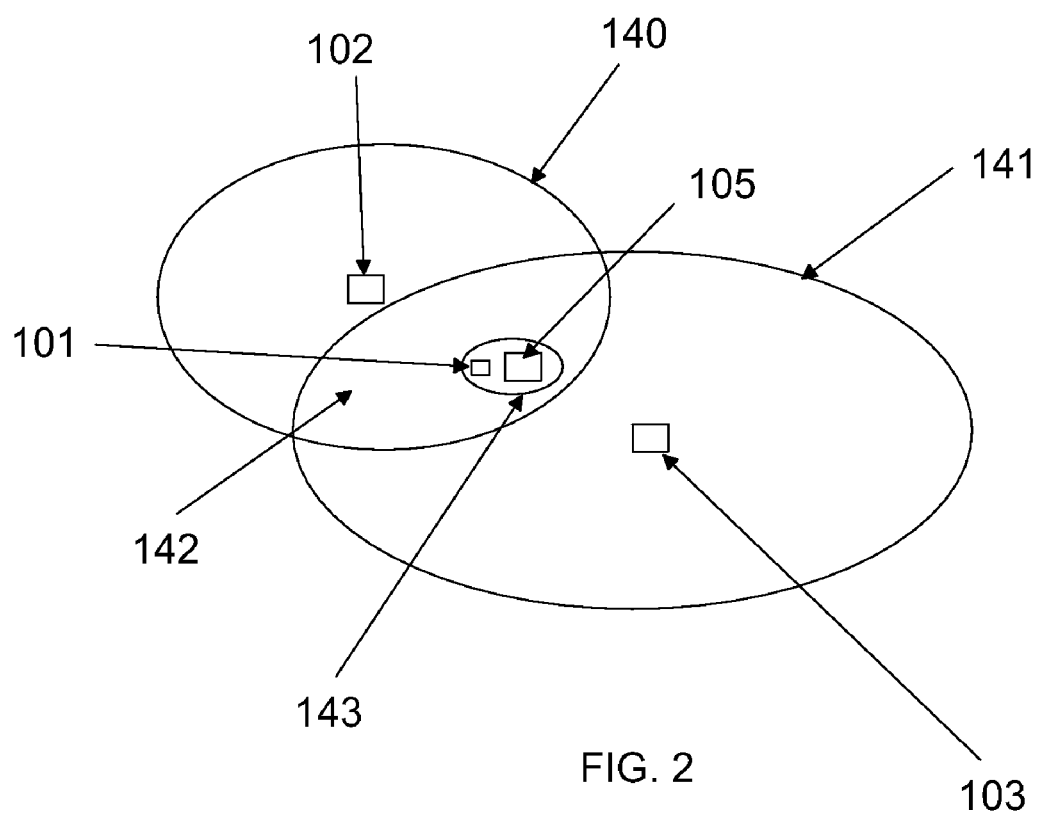
FIG. 2 is a generalized topographic view of communication ranges of cellular towers and a Wi-Fi network's access points and range extenders.

In a local determination embodiment of the invention, the cellular device receives and stores an SSID or BSSID of network 105. By comparison of the received SSID with a table of communications ranges of known Wi-Fi networks, the cellular device determines the second geographic location to be the communications territory of the Wi-Fi network 105 if that network data has been previously determined or stored. The control program may direct that the second geographic location be displayed on a liquid crystal display screen of the cellular device 101 or be transmitted to recipient 114. In all the embodiments, recipient 114 may be a device used by someone with a personal, business or other legal reason for receiving a closest physical location of the user of device 101. For instance, recipient 114 may be a personal or business relation of the user of device 101 and desires to know their physical location for the purposes of arranging a meeting. In such a case, device 101 may be configured to accept, deny or notify the user of device 101 of a request from recipient 114 to transmit a second geographical location or to limit details of thereof. If network 105 is unknown after such comparison, the control program of device 101 assigns a default transmission range to network 105 and locates that transmission range within the first geographical location as the second geographical location based upon comparing signal strengths of towers 102 and 103. FIG. 2 shows towers 102 and 103 having, respectively, communication ranges 140 and 141, with an overlap 141. Overlap 141 is the first geographic location if device 101 communicates with both tower 102 and 103. FIG. 2 also shows that network 105 has a communications range of 143 and is located within overlap 142. Communications range 143 is the second geographical location for device 101 for all cases where network 105 consists of a single broadcast point, such as a single access point.

Referring again to FIG. 1, the control program of device 101 alternately causes a data request to be transmitted via network 102 to recipient 114 or to network 105 for information defining the communications range of all the wireless communications nodes of network 105. Or the control program of device 101 causes a data request to be transmitted via network 105 to network 105 or recipient 114 for information defining the communications range of all the wireless communications nodes of network 105. Data received that is responsive to these requests is used to determine a second geographic location of device 101. A request by device 101 for physical location of a communication range of access points or other devices in current communication with device 101 may be directed to a website recipient via Internet 110, where the website is maintained to provide an authorized user to access physical location information of communication ranges of specific Wi-Fi networks. Wi-Fi network 105 may maintain as an option at a captive portal the desired physical location information of the communications ranges of its wireless access points, which data might be supplied in exchange for a payment by a user.

Figure 3:
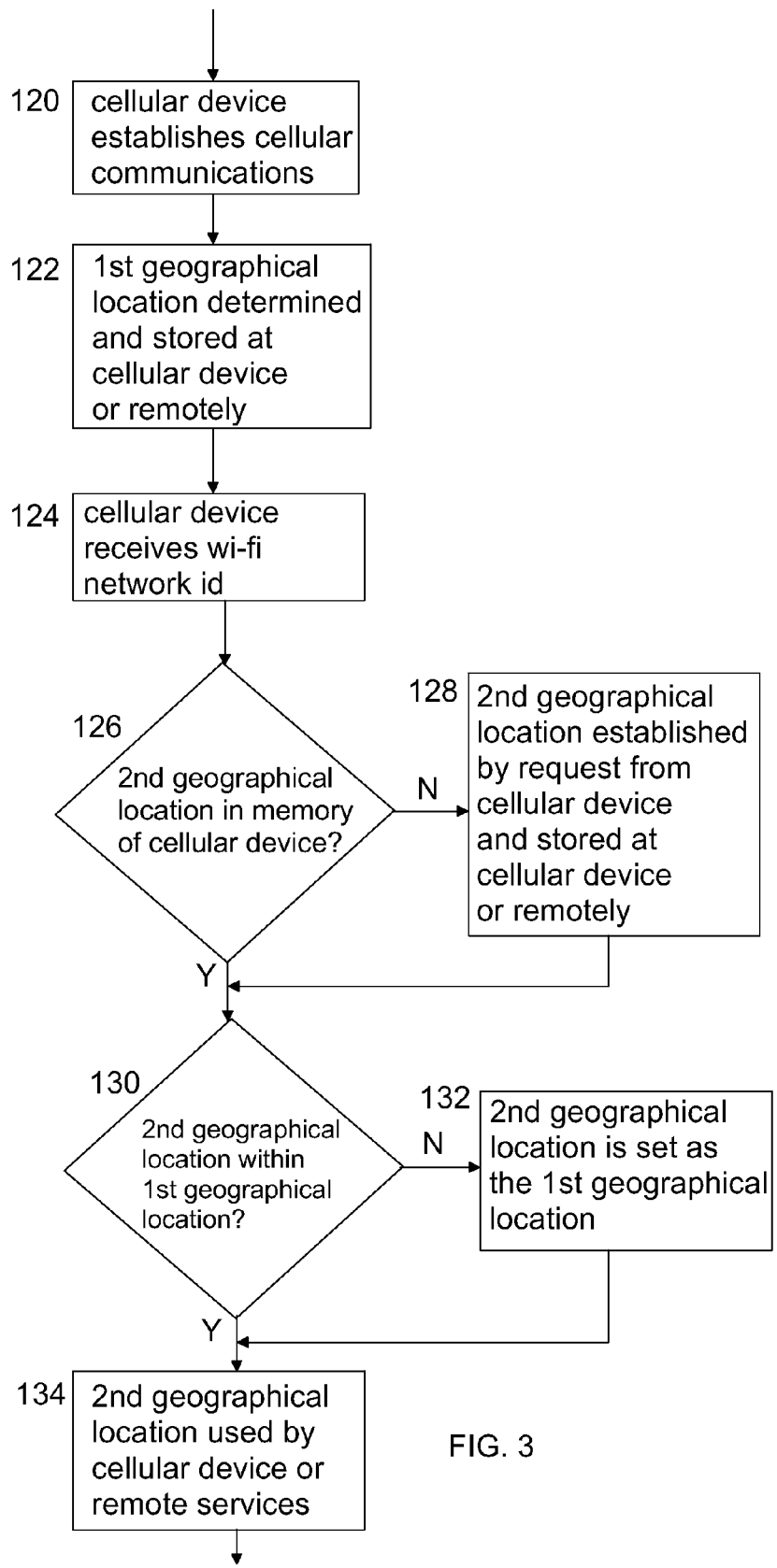
FIG. 3 is high level flow diagram of one embodiment of the invention system.

FIG. 3 represents high level flow diagram of one embodiment of the invention system comprising steps 120 through 134. The invention system, in this embodiment, requires establishment of a cellular communication session between a wireless communication module of a cellular device with Wi-Fi capability and a cellular communications network in step 120. At step 122, communications between the cellular device and the cellular network results in a determination of the physical location of the cellular device to be within a physical topographical area designated as the first geographic location. At step 124, another wireless communication module of the cellular device communicates with a Wi-Fi network by receiving its Wi-Fi network identification (SSID). At step 126, a control program resident in the microprocessor of the cellular device searches a network identification table for the presence of a pre-stored physical territory of the Wi-Fi network's communication range. If the physical location of the Wi-Fi network is not resident in the memory of the cellular device, the cellular device conducts communications via the cellular network with a remote recipient or the Wi-Fi network to obtain the physical territory of the Wi-Fi network's communication range and assign to it the designation of second geographical location.

Step 130 is optional, in that the cellular device determines whether the second geographical location is at least in part within the first geographical location. The determination of the first geographical location is the result of current communications with specific cellular antenna towers. The determination of the second geographical location is made on the basis of stored information, which may be out of date or less reliable. If the second geographical location is not at least in part within the first geographical location, in step 132 the second geographical location is set to be the same as the first geographical location. Alternately, the second geographical location can be a portion of the first geographical location located at the part of the first geographical location toward the cellular antenna tower with the strongest signal. The determination that the physical territory of the Wi-Fi network's communication range does not lie even in part within the first geographical location may be transmitted to a remote recipient for updating a database of such location data.

In step 134, the second geographical location is transmitted by the cellular device to a remote recipient by way of communications with the cellular and/or Wi-Fi network or vice versa. In a specific example, the second geographical location is retrieved from a memory of the cellular device and transmitted as text to a display screen of another cellular phone subscriber, where the text may have been transmitted automatically upon connection with the other cellular phone subscriber or may have been transmitted at the option of the user by depressing one or more buttons of a typical user interface for a cellular phone. The physical location of the user as the second geographical location may be of interest to the other cellular phone subscriber or may provide life or death rescue information. In addition, a cellular device may be lost by a user within communications range of a Wi-Fi network, whereby the cellular device can automatically communicate with the cellular network via SMS or equivalent means to automatically transmit its second geographical location thereto. The second geographical location can be made available by the cellular network to an authorized account holder for the cellular device, where the information can be transmitted via text by email, voice mail, or by communication with another cellular device owned by the user so that the location cellular device and the and time and date is was there can be retrieved by a user to narrow the geographic range of a search for the cellular device. In another embodiment, the cellular device is an effective tracking device where it periodically determines the second geographical location and transmits that information with a time and date to a remote recipient.

FIG. 4 shows device 101 comprising a microprocessor with a control program and input/output means for connection to wireless communication modules 120, liquid crystal display 121, user audio interface 122, and user button interface 123. Interface 122 comprises means for audio output detectable by a user and audio input by the user.

FIG. 5 shows a front view of a representative mobile device 101 which comprises a housing 124 supporting for presentation a liquid crystal display screen 121, a push button interface 123 for input by a user with direction buttons 127. Screen 121 shows an upper level menu 125 presented to a user for viewing and selection of functions of device 101. Among the available selections are the options to review previous outgoing and incoming calls, messages, and to activate a "Connections" function, which is highlighted. A user presses a button or inputs an audio command which causes an activation of the Connection functions of device 101, whereupon a next screen 121 of other functions and information is presented as in FIG. 6. Optionally, small speaker comprising a part of audio interface 122 provides a spoken phrase or word 122a ("Connection") of a highlighted menu selection so that a user need not read the selection. Alternately, information received by way of incoming wireless transmissions may include identifying text which a microprocessor of the first mobile phone causes to be automatically displayed on screen 121 or to be audibly output via the small speaker of the audio interface 122.

In a form of the invention for local bi-modal communication, it is intended that a dual mode wireless device communicate by way of two different types of wireless communication networks to obtain information concerning another locally situated dual mode wireless device or information related to locally situated businesses, persons, services, or goods. In this embodiment, (1) a first wireless mobile phone or other device is capable of establishing voice and/or short message communications with a second wireless mobile phone through a first cellular or wide area communications network (such as under the GSM protocol enabled with SMS) and (2) a communications session may also be established between the first mobile phone and a second local wireless communications network such as 802.xx wireless LAN. One well known example of 802.xx wireless LAN is the peer to peer network established under the IEEE 802.15 Bluetooth protocol, which is known for its limited broadcast range, i.e., that two peer devices establishing a communications session are necessarily located within a physically small area. Local networks also operate under IEEE 802.11 protocols by way of base stations and wireless access points.

In this bi-modal communication form, the first mobile phone comprises means for detecting through that it is within broadcast range of the second local network. Upon detecting that it has entered such a broadcast range, the first mobile phone establishes a communications session with the first wide area network, transmitting to a remote correspondent server (either directly by SMS message or by data transmission to a server connected by Internet) sufficient information so that said server can determine a locality of the first mobile phone by identification of the second local network or otherwise. The remote correspondent server then acts to transmit to the first mobile phone information concerning a locally situated second mobile phone or information related to locally situated businesses, persons, services, or goods.

The remote correspondent server also may operate as a trusted intermediate for further transmission of SMS message requests from the first mobile phone to the second mobile phone for information about that second mobile phone. The second mobile phone responds with a transmission of the remote correspondent server with potentially sensitive operating data of the second mobile phone and/or stored personal data of the user of the second mobile phone.

In a specific example, a user carries through an airport a first mobile phone enabled for and connected with a cellular network under the GSM protocol and capable of transmission of short messages by way of SMS protocol. The first mobile phone detects the presence of a 802.11 wireless LAN, whereupon a short text message is transmitted to the remote correspondent server with an SSID or identification of a local physical area of a broadcast range of the 802.11 wireless LAN. A response of the remote correspondent server is made transmitting through the cellular network data concerning local goods or services available in the local area.

Alternately, the first mobile phone detects the presence of peer network operating IEEE 802.15 Bluetooth protocol and the presence on that network of a pre-authorized peer (i.e., a friend or acquaintance). Subsequently, a short text message is transmitted to the remote correspondent server with an identification of said peer. The remote correspondent either transmits to the first mobile phone a set of peer information for the second mobile phone stored at the server or facilitates re-transmission of the short message to the second mobile phone. The first mobile phone thereafter receives a set of peer information for the second mobile phone which is displayed or played as an audio output.

FIG. 6 is another view of the display screen 121 but showing Connections functions allotted to two sub-menu options, i.e., Identification and Characteristics, which each provide sub-menus of a set of peer information for the second mobile phone or information concerning local goods or services available in the local area. These sub-menus are optional, as any single item of Connections data may be displayed immediately and/or by itself or played out audibly.

Figure 7:
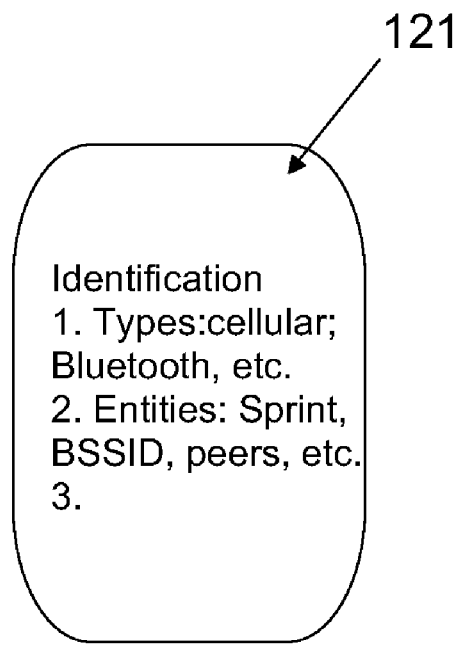
FIG. 7 is a further display screen of the device of FIG. 6.

Connections sub-menu Identification of FIG. 7 show that identification information about a second mobile phone obtained from the invention system includes types of wireless networks for which the second mobile phone is enabled and the specific identification of those networks (such as Sprint® for cellular, an SSID for a LAN, etc.).

Figure 8:
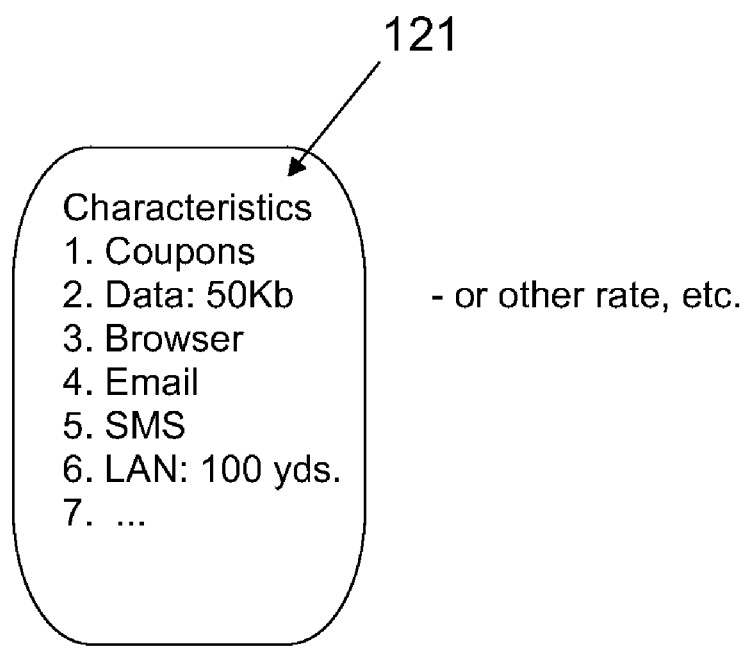
FIG. 8 is a further display screen of the device of FIG. 6.

Connections sub-menu Identification of FIG. 8 show that characteristics information about a second mobile phone obtained from the invention system includes a first option for retrieving coupons or contacts for goods or services from the second mobile phone which may be used locally by a user of the first mobile phone and which are made available by the user of the second mobile phone. Additional items of information include capabilities of the second mobile phone such as maximum data transfer rate, Internet browser capability, email capability, SMS capability, LAN range, etc.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

I claim:

1. A wireless device comprising:
a first communication module configured to communicate with a cellular antenna tower of a cellular network;
a second communication module configured to communicate with a device associated with a Wi-Fi network,
wherein, in response to a connection being not established between the wireless device and the Wi-Fi network, the first communication module is configured to
transmit a first short message service (SMS) message to a remote server, wherein the first SMS message includes information identifying the device associated with the Wi-Fi network, and
receive, in response to the first SMS message, a second SMS message from the remote server, the second SMS message including information identifying a location of the device associated with the Wi-Fi network, and
wherein, in response to a connection being established between the wireless device and the Wi-Fi network, the second communication module is configured to
transmit a first message to the remote server, wherein the first message includes information identifying the device associated with the Wi-Fi network, and
receive, in response to the first message, a second message from the remote server, the second message including information identifying the location of the device associated with the Wi-Fi network; and
a processor configured to
determine a first territorial range in which the wireless device is located based on a location of the cellular antenna tower of the cellular network,
determine a second territorial range in which the wireless device is located based on the location of the device associated with the Wi-Fi network, and
in response to the second territorial range being within the first territorial range, establish a location of the wireless device as being within the second territorial range.

2. The wireless device of claim 1, wherein the first communication module is configured to transmit the established location of the wireless device to a remote device.

3. The wireless device of claim 1, wherein the device associated with the Wi-Fi network is an access point or a repeater.

4. The wireless device of claim 1, wherein:
the processor is configured to periodically update the established location of the wireless device, and
the first communication module is configured to transmit the updated established location of the wireless device to a remote device with time and date at which the established location of the wireless device is updated.

5. The wireless device of claim 1, wherein:
the processor is configured to periodically update the established location of the wireless device, and
store the updated established location of the wireless device in memory of the wireless device.

6. The wireless device of claim 1, wherein:
the processor is configured to determine the location of the device associated with the Wi-Fi network by looking up a table stored in memory of the wireless device,
wherein an entry in the table includes i) an identifier of the Wi-Fi network and ii) a corresponding territory in which the Wi-Fi network is located.

7. The wireless device of claim 1, wherein:
the established location of the wireless device includes location-defining data including city and state; a street address; a latitude and a longitude; and a landmark, a residence, a business, a service, or a risk located proximate to the wireless device; and
the first communication module is configured to transmit one or more of the location-defining data to a remote device.

8. The wireless device of claim 1, wherein the first communication module is further configured to transmit i) the established location of the wireless device and ii) a status message to a remote device, wherein the status message indicates an emergency event associated with a user of the wireless device.

9. A method for establishing a location of a wireless device, wherein the wireless device is in communication with i) a cellular antenna tower of a cellular network and ii) a device associated with a Wi-Fi network, the method comprising:
   determining a location of the cellular antenna tower of the cellular network;
   determining a location of the device associated with the Wi-Fi network,
   wherein determining the location of the device associated with the Wi-Fi network comprises, in response to a connection being not established between the wireless device and the Wi-Fi network,
      transmitting a first short message service (SMS) message to a remote server via the cellular network, wherein the first SMS message includes information identifying the device associated with the Wi-Fi network, and
      receiving, in response to the first SMS message, a second SMS message from the remote server via the cellular network, the second SMS message including information identifying the location of the device associated with the Wi-Fi network, and
   wherein determining the location of the device associated with the Wi-Fi network comprises, in response to the connection being established between the wireless device and the Wi-Fi network,
      transmitting a first message to the remote server via the Wi-Fi network, wherein the first message includes information identifying the device associated with the Wi-Fi network, and
      receiving, in response to the first message, a second message from the remote server via the Wi-Fi network, the second message including information identifying the location of the device associated with the Wi-Fi network;
   determining a first territorial range in which the wireless device is located based on the location of the cellular antenna tower of the cellular network;
   determining a second territorial range in which the wireless device is located based on the location of the device associated with the Wi-Fi network;
   in response to the second territorial range being within the first territorial range, establishing the location of the wireless device as being within the second territorial range; and
   storing the established location of the wireless device in a memory of the wireless device.

10. The method of claim 9, further comprising transmitting a short message service (SMS) message including the established location of the wireless device to a remote device.

11. The method of claim 9, wherein the device associated with the Wi-Fi network is an access point or a repeater.

12. The method of claim 9, further comprising:
   periodically updating the established location of the wireless device; and
   transmitting the updated established location of the wireless device to a remote device with time and date at which the established location of the wireless device is updated.

13. The method of claim 9, further comprising:
   periodically updating the established location of the wireless device; and
   storing the updated established location of the wireless device in the memory of the wireless device.

14. The method of claim 9, further comprising:
   determining the location of the device associated with the Wi-Fi network by looking up a table stored in the memory of the wireless device,
   wherein an entry in the table includes i) an identifier of the Wi-Fi network and ii) a corresponding territory in which the Wi-Fi network is located.

15. The method of claim 9, wherein the established location of the wireless device includes location-defining data including city and state; a street address; a latitude and a longitude; and a landmark, a residence, a business, a service, or a risk located proximate to the wireless device; the method further comprising:
   transmitting a short message service (SMS) message including one or more of the location-defining data to a remote device.

16. The method of claim 9, further comprising:
   transmitting a short message service (SMS) message including i) the established location of the wireless device and ii) a status message to a remote device,
   wherein the status message indicates an emergency event associated with a user of the wireless device.

* * * * *